United States Patent [19]
Scerbo, III

[11] Patent Number: 5,546,124
[45] Date of Patent: Aug. 13, 1996

[54] SIDEARM HANDGUN HOLSTER-MOUNTED SURVEILLANCE RECORDER CARRIER VESSEL

[76] Inventor: Frank C. Scerbo, III, P.O. Box 5274, Parsippany, N.J. 07054

[21] Appl. No.: 489,380

[22] Filed: Jun. 12, 1995

[51] Int. Cl.⁶ .................................................. H04N 7/18
[52] U.S. Cl. ........................ 348/158; 224/914; 348/373; 360/5
[58] Field of Search ........................ 348/143, 148–59, 348/373, 375, 376; 360/5; 224/911, 912, 227, 914; H04N 7/18

[56] References Cited

U.S. PATENT DOCUMENTS

| | | | |
|---|---|---|---|
| 1,993,436 | 3/1935 | Eberhard | 455/100 |
| 3,530,451 | 9/1970 | Devine | 340/539 |
| 3,919,615 | 11/1975 | Niecke | 224/227 |
| 4,107,611 | 8/1978 | Holcomb | 455/18 |
| 4,516,157 | 5/1985 | Campbell | 348/376 |
| 4,967,282 | 10/1990 | Malavasi | 348/376 |
| 5,012,335 | 4/1991 | Cohodar | 348/158 |
| 5,108,019 | 4/1992 | Woodward | 224/911 |
| 5,211,321 | 5/1993 | Rodriguez | 224/227 |
| 5,341,171 | 8/1994 | Mori | 348/373 |
| 5,400,185 | 3/1995 | Scerbo, III | 348/143 |

*Primary Examiner*—Howard W. Britton
*Attorney, Agent, or Firm*—William T. Hough, Esq.

[57] ABSTRACT

A composite of an audio and/or video recorder mounted and securable on a handgun holster having a holster-mounted recorder-activation switch activatable of the recorder upon withdrawal of the handgun from the holster, remaining activated until return of the handgun to the holster. Other weapon holsters also each with a recorder activation switch in each holster are activateable when the weapon is withdrawn, mounted in parallel electrical circuitry with the handgun-activation switch, for additional weapons such as mase and a baton.

34 Claims, 3 Drawing Sheets

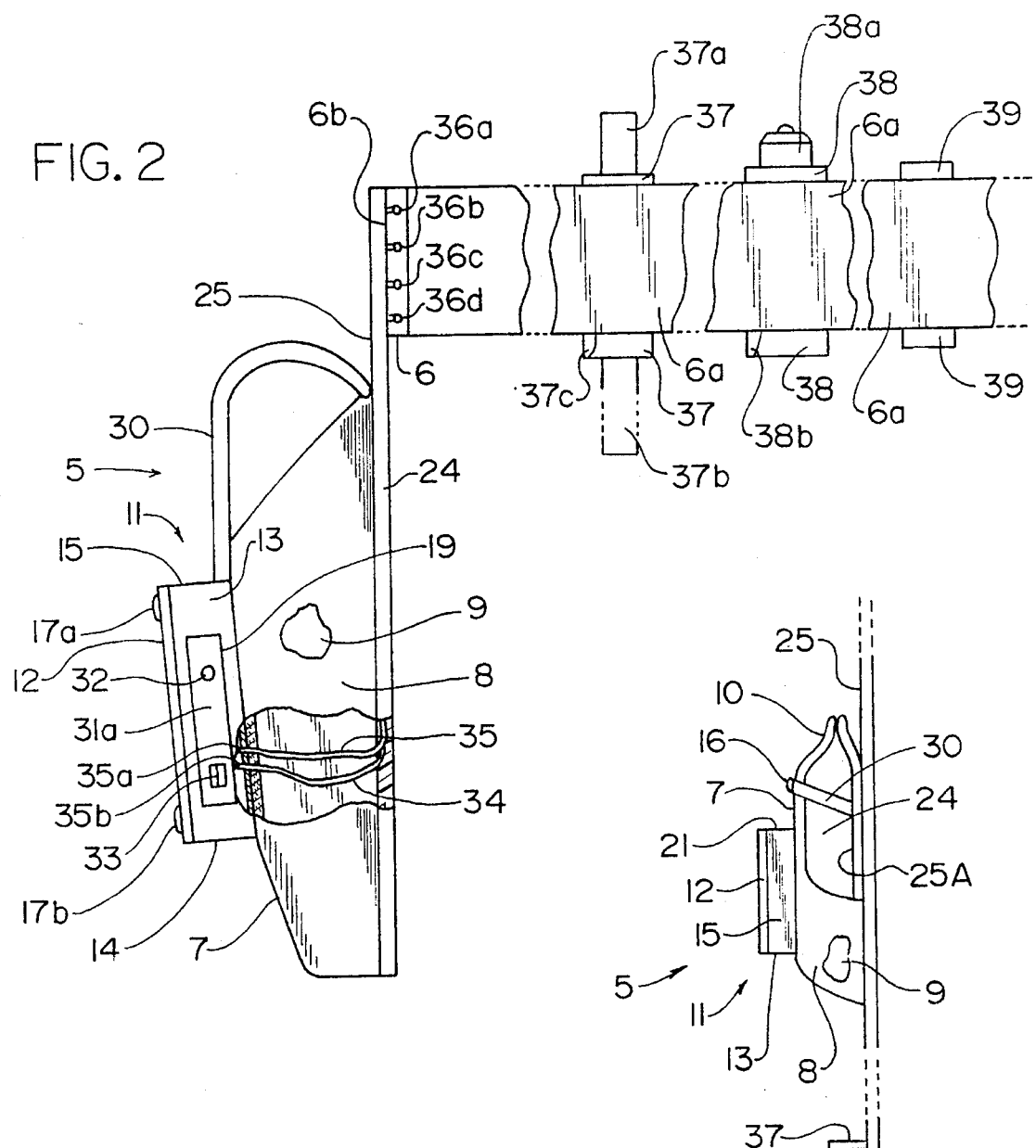

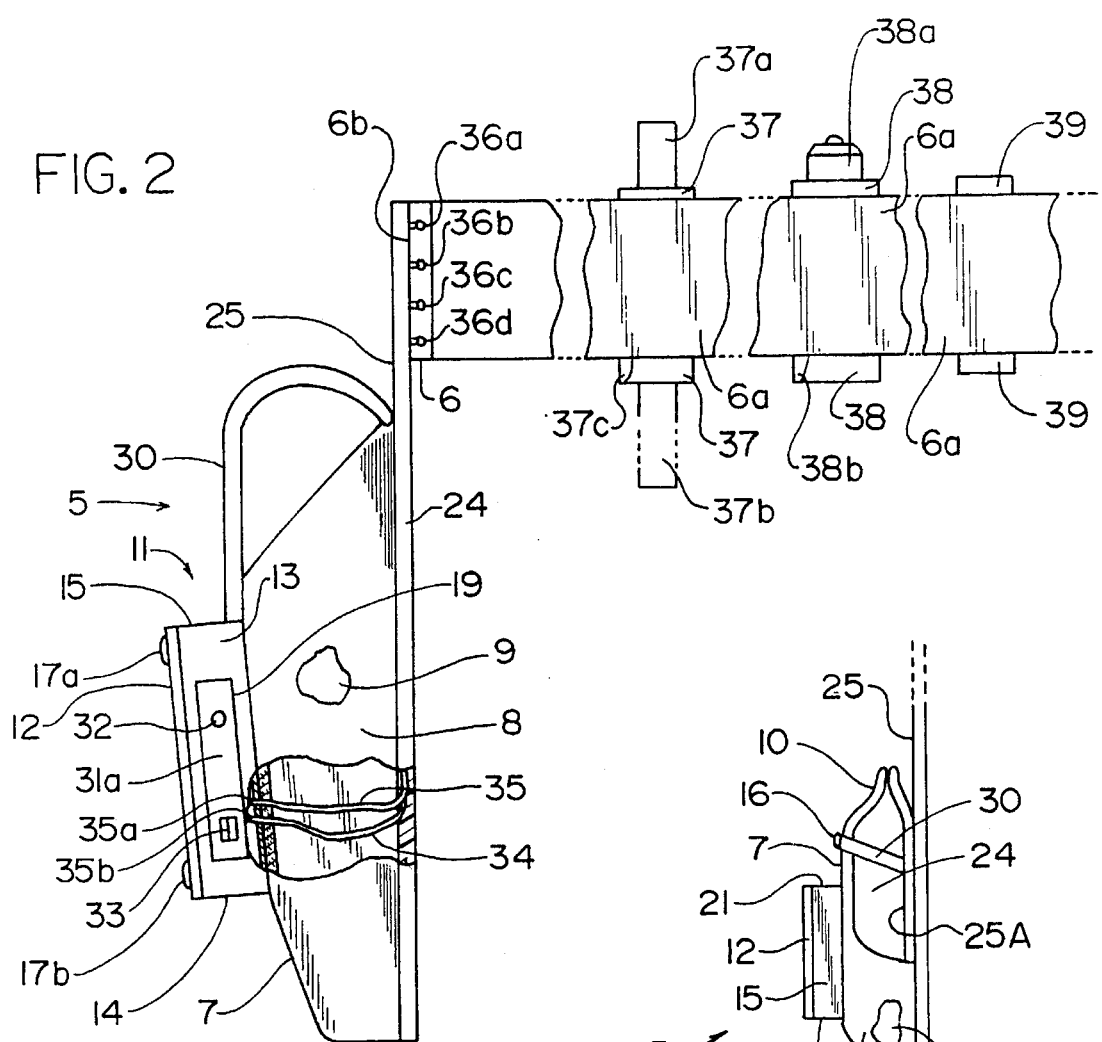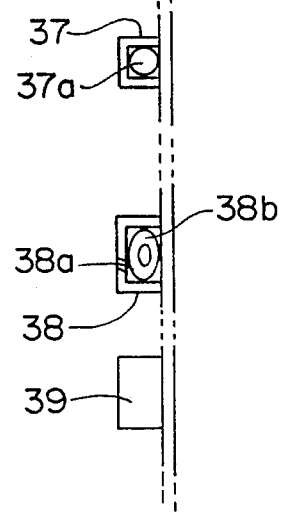

5,546,124

SIDEARM HANDGUN HOLSTER-MOUNTED SURVEILLANCE RECORDER CARRIER VESSEL

This invention of this application constitutes an improvement on the patented invention of U.S. Pat. No. 5,400,185 issued Mar. 21, 1995, the present invention having been conceived before the issue date of that patent.

ACKNOWLEDGED PRIOR ART

A prior art search having been conducted in United States Class 340, subclasses 539 and 572, and in United States Class 42, subclass 1.13, while no relevant patents were located, patents of interest include U.S. Pat. Nos. 1,993,436 to Eberhard, and 3,530,451 to Devine, and 5,108,019 to Woodward et al., as follow:

1) Eberhard patent: a dog collar carries a signal transmitting device designed to emit a signal, which signal transmitting device is activatable by a key-pressable device carried typically in the pocket of the associated police officer; and 2) Devine patent: a belt-mounted alarm and gun containing holster with an audible alarm actuation switch activateable of the alarm by withdrawal of the gun from the holster; and 3) Woodward et al.: when prior to removal of a holstered gun, a fastened flexible strap retaining the gun in its holster is withdrawn, an audible alarm becomes thereby actuated.

DESCRIPTION OF THE INVENTION

A) Description of the invention having meaning and context in light of prior background, relevant background is as follows, enabling understanding of the invention.

Prior to the invention, during wintry weather period, police officers typically wear warming police jacket or police coat each characterized by having a substantially vertical upwardly slit extending upwardly from typically the side bottom edge at a location adjacent a sidearm gun-mounting belt-worn gun holster that accessibly protrudes through the slit, making ready access of the gun for speedy emergency withdrawal by the police officer. For a surveillance recorder to be routinely viewable of evidence during police officer involvement in police duties requiring the officer's full concentration, devoid of removing his coat or jacket, this invention is principally directed to overcoming prior existing problems and difficulties in making readily or speedily available desired surveillance, particularly when it has become necessary for the police officer to withdraw his gun from its holster.

B) Knowledge and understanding of objects of the invention, make possible improved understanding of the purpose and relevance of the following inventive structure in light of prior background and present objects, as follow.

Accordingly, a typical object of the present invention is to obtain surveillance recorder body-mounting structure making readily accessible surveillance by the recorder for immediate recording whenever unexpected and/or preoccupying police emergency activities require.

Another object is to obtain a surveillance recorder body-mounting structure automatically activateable to record ongoing desired-recordable activities initiated and/or occuring substantially concurrently at the time of withdrawal of a police officer's sidearm gun from its holster, or withdrawal of other weapon from the policeman's holster or carrying case therefor.

Another object is to concurrently achieve one or more preceding objects, while additionally ascertaining unauthorized easy removal and/or tampering with the policeman-mounted surveillance recorder.

Another object is to provide accessory additional direct current battery power for actuation of switches and/or surveillance recorder and/or multiple units power demand, in substitution for or to complement power packs carried by the surveillance recorder and/or other power-driven units providing back-up power and/or supplemental power for other one or more additional power-requiring units; and/or circuitries therefor or thereto.

Another object is to provide one or more of the foregoing objects, including additionally the inclusion of appropriately concealed and unobstructive power circuitry therefor, providing back-up and/or supplemental circuitries as might be desired or required.

Another object is to achieve one or more preceding objects, while obtaining and maintaining the surveillance recorder body-mounting structure together with obtaining desired positioning of the surveillance recorder devoid of view-obstructing structure(s).

Another object is to include a designated evidence-recording unit as a part of an aforestated and hereinafter described surveillance recorder body-mounting structure, while achieving one or more preceding objects.

Another object is to obtain a circuitry interconnecting a plurality of separate weapons-carrying structure or cases, with separate activatable switches mounted in electrical parallel with one for separate independent activation of the surveillance recorder by the respective switches thereof.

Another object is to include as a part of the surveillance recorder, or as an accessory thereto, an automatic time and/or date recorder to automatically record the time and/or date of each activation of the surveillance recorder.

Other objects become apparent from the preceding and following invention description.

C) The Invention

Broadly as a first broad embodiment, the invention may be described as a surveillance and recording unit-mountable handgun holster device. The surveillance and recording unit-mountable handgun holster device is adaptable for ready access and exposure to surrounding evidentiary recordable data, when the device is mounted on a body-worn sidearm weapon-mounting support structure and concurrently extending through a substantially vertical side-slit of a police-like jacket or coat and when the coat or jacket is concurrently worn. The aforestated device, as a combination broadly includes:

1) a sidearm handgun holster that includes

A) A first sideface portion has a first outer surface thereof positioned to face substantially inwardly toward a first location of a side of a trunk of a person, at a point in time when wearing a sidearm weapon-mounting support structure for mounting a handgun holster. The first outer surface has oppositely directed first forward and first trailing portions.

B) A second sideface portion has a second outer surface thereof positioned to face substantially outwardly toward a second location away from the side of the trunk of the person wearing a sidearm weapon-mounting support structure. The second outer surface also has oppositely directed second forward and second trailing portions.

C) A forwardly facing portion has a third outer surface thereof positioned to face substantially forwardly of the trunk of the person wearing a sidearm weapon-mounting support structure. The forwardly facing portion is positioned intermediate between and continuous with and interconnecting the first forward portion and the second forward portion. and D) The first trailing portion and the second trailing portion are connected to one another forming:
(i) a handgun-receivable receptacle and handgun mounting space thereof; and
(ii) a handgun access-port to and from the handgun-receivable receptacle, of an access-port size and shape suitable for and adapted for alternately sequential mounting and withdrawing of a handgun therethrough, the handgun-receivable receptacle. The resulting mounting space thereof and the handgun access-port jointly form a handgun holster alternately sequentially mountably receivable and withdrawable of a handgun; and E) Holster-mounting structure is mountable of the handgun holster onto a sidearm weapon-mounting support structure.

2) A surveillance and recording unit-mountable vessel-forming structure:
A) is mounted on the sidearm handgun holster; and
B) forms:
i) a surveillance and recording structure(s) (and mechanism thereof) retainer unit, and
ii) a retainer unit first port thereof adapted for:
(a) alternately mounting and withdrawal of a surveillance and recording structure(s) (and mechanism thereof), and
(b) providing associated mounting space for a portable surveillance and recording structure(s)(and mechanism thereof). The associated mounting space is of a first size and shape receivable of and transportable of a portable surveillance and recording structure(s) (and mechanism thereof); and.
C) the surveillance and recording structure(s) aforenoted are adapted to sequentially alternately turn on and turn off the recording mechanism thereof of evidentiary events occuring within detectable distances of the recording structure(s) (and mechanism thereof). The retainer unit first port is further inclusive of a port closure structure(s) (and mechanism thereof) for sequentially alternately nonaccess and access to and from the associated mounting space.
D) The surveillance and recording structure(s) (and mechanism thereof) retainer unit includes a retainer unit second port of a second size and shape:
i) insufficiently large for insertion therethrough of a portable surveillance and recording structure(s) (and mechanism thereof) for alternately turning on and off recording mechanism thereof of evidentiary events occuring within detectable distances and sufficient for detection therethrough of recordable evidentiary events occuring within detectable distances thereof, and
ii) sufficiently large for detection therethrough of recordable evidentiary events occuring within detectable distances thereof by a portable surveillance and recording structure(s) (aforestated) for sequential alternately turning on and off recording mechanism of the recording thereby of evidentiary events.

In a first preferred embodiment as an improvement on the foregoing first broad embodiment, the surveillance and recording unit-mountable includes a circuitry structure(s) (aforestated) provides battery power to and is adapted to be operatively connected to a surveillance and recording unit when a surveillance and recording unit is mounted within the surveillance and recording unit-mountable vessel-forming structure. In such instance, the circuitry structure(s) (aforestated) are mounted on at-least one of the sidearm handgun holster and the surveillance and recording unit-mountable vessel-forming structure.

In a second preferred embodiment as an improvement on the foregoing first broad invention, there is additionally included the sidearm weapon-mounting support structure and including a circuitry structure(s) (aforestated) which provide battery power to and are operatively connected or adapted to be operatively connected to a surveillance and recording unit aforestated when a surveillance and recording unit is mounted within the surveillance and recording unit-mountable vessel-forming structure. The circuitry structure(s) aforestate is mountable or mounted on at-least one of the sidearm handgun holster, the surveillance and recording unit-mountable vessel-loaning structure and the sidearm weapon-mounting support structure.

In a third preferred embodiment as an improvement on the foregoing first broad embodiment, a semiautomatic on-off switch structure(s) (aforestated) is adapted to be sequentially alternately activating and deactivating a surveillance and recording structure(s) (aforestated) when mounted within the surveillance and recording unit aforestated, with the surveillance and recording unit-mountable vessel-forming structure being mountable or mounted on at-least one of the sidearm handgun holster and the surveillance and recording unit-mountable vessel-forming structure Thereby, withdrawal of a handgun from the sidearm handgun holster activates the surveillance and recording structure(s) (aforestated) and insertion of a handgun into the sidearm handgun holster deactivates the surveillance and recording structure(s) (aforestated), whenever concurrently the surveillance and recording structure(s) (aforestated) are mounted with the surveillance and recording unit-mountable vessel-forming structure.

In a fourth preferred embodiment as an improvement on the foregoing first broad invention, the retainer unit second port is positioned in the first forward portion.

In a fifth preferred embodiment as an improvement on the foregoing first broad invention, the retainer unit second port is of a dimensional size sufficiently large as to provide outside access to activation and control structure(s) (aforestated) adapted for the alternate turning on and off and for operating multiple functions of a surveillance and recording structure(s) (aforestated) when mounted within the retainer unit.

In a sixth preferred embodiment as an improvement on the foregoing first broad invention, the retainer unit includes a third port of a dimensional size sufficiently large as to provide outside access to activation and control structure(s) (aforestated) adapted for the alternate turning on and off and for operating multiple functions of a surveillance and recording structure(s) (aforestated) when mounted within the retainer unit.

In a seventh preferred embodiment as an improvement on the foregoing first broad invention, at least one of the surveillance and recording structure(s) (aforestated) retainer unit and a retainer unit first port structure include the port closure structure(s) (aforestated) for alternately nonremovably locking a surveillance and recording structure(s) (aforestated) into the surveillance and recording structure(s) (aforestated) retainer unit during periods of intended activation of a surveillance and recording structure(s) (aforestated), and removably unlocking the surveillance and recording structure(s) (aforestated) retainer unit for permitting removal of a previously utilized surveillance and recording structure(s)(aforestated), during period of loading or reloading a replacement surveillance and recording structure(s) (and mechanism thereof) into the surveillance and recording structure(s) (aforestated) retainer unit.

In a eighth preferred embodiment as an improvement on the foregoing first broad invention, the port closure structure(s) (aforestated) includes at-least one tamper-proof screw which when mounted locks the locking structure(s) (and mechanism thereof), and when dismounted, unlocks the locking structure(s) (aforestated) thereof).

In a ninth preferred embodiment as an improvement on the foregoing first preferred embodiment, there is included the sidearm weapon-mounting support structure. Also there is included circuitry structure(s) (and mechanism thereof) for providing battery power to and for being operatively connected to a surveillance and recording unit when a surveillance and recording unit is mounted within the surveillance and recording unit-mountable vessel-forming structure. The circuitry structure(s) (aforestated) are mounted on at-least one of the sidearm handgun holster, the surveillance and recording unit-mountable vessel-forming structure and the sidearm weapon-mounting support structure.

In a tenth preferred embodiment as an improvement on the foregoing ninth preferred embodiment, a semiautomatic on-off switch structure(s) (aforestated) for alternately activating and deactivating a surveillance and recording structure(s) (aforestated) when mounted within the surveillance and recording unit-mountable vessel-forming structure, is mounted on at-least one of the sidearm handgun holster and the surveillance and recording unit-mountable vessel-forming structure. Accordingly, there is provided for withdrawal of a handgun from the sidearm handgun holster activates the surveillance and recording structure(s) (aforestated) and for insertion of a handgun into the sidearm handgun holster to deactivate the surveillance and recording structure(s) (aforestated), whenever concurrently the surveillance and recording structure(s) (aforestated) are mounted with the surveillance and recording unit-mountable vessel-forming structure.

In a eleventh preferred embodiment as an improvement on the foregoing tenth preferred embodiment, the retainer unit second port is positioned in the first forward portion.

In a twelfth preferred embodiment as an improvement on the foregoing eleventh preferred embodiment, the retainer unit second port is o f a dimensional size sufficiently large as to provide outside access to activation and control structure(s) (and mechanism thereof) for turning on and for operating multiple functions of a surveillance and recording structure(s) (aforestated) when mounted within the retainer unit.

In a thirteenth preferred embodiment as an improvement on the foregoing twelfth preferred embodiment, the retainer unit includes a third port of a dimensional size sufficiently large as to provide outside access to activation and control structure(s) (aforestated) for alternate turning on and for operating multiple functions of a surveillance and recording structure(s) (aforestated) when mounted within the retainer unit.

In a fourteenth preferred embodiment as an improvement on the foregoing thirteenth preferred embodiment, at least one of the surveillance and recording structure(s) (aforestated) retainer unit and a retainer unit first port structure includes the port closure structure(s) (aforestated) for alternately nonremovably locking a surveillance and recording structure(s) (and mechanism thereof) into the surveillance and recording structure(s) (aforestated) retainer unit during periods of intended activation of a surveillance and recording structure(s) (aforestated), and removably unlocking the surveillance and recording structure(s) (aforestated) retainer unit for permitting removal of a previously utilized surveillance and recording structure(s) (aforestated), during period of loading or reloading a replacement surveillance and recording structure(s) (aforestated) into the surveillance and recording structure(s) retainer unit.

In a fifteenth preferred embodiment as an improvement on the foregoing fourteenth preferred embodiment, the port closure structure(s) includes at-least one tamper-proof screw which when mounted locks the locking structure(s), and when dismounted, unlocks the locking structure(s) (aforestated).

In a sixteenth preferred embodiment as an improvement on the foregoing first broad invention, the port closure structure(s) (aforestated) includes at-least one tamper-proof screw which when mounted locks the locking structure(s) (aforestated), and when dismounted, unlocks the locking structure(s) (aforestated).

In a seventeenth preferred embodiment as an improvement on the foregoing first broad invention, there is included the surveillance and recording structure(s) (aforestated).

In a eighteenth preferred embodiment as an improvement on the foregoing seventeenth preferred embodiment, the surveillance and recording structure(s) (aforestated) includes a sound-recording mechanism.

In a nineteenth preferred embodiment as an improvement on the foregoing seventeenth preferred embodiment, the surveillance and recording structure(s) (aforestated) includes sound-recording and video mechanisms.

In a twentieth preferred embodiment as an improvement on the foregoing eighteen preferred embodiment, the surveillance and recording structure(s) (aforestated) includes:

a) a recording structure(s) (aforestated) for recording at-least one of audio and video signals, for providing interior space for containing a recording substrate therein and for intermittent alternate code-locking and unlocking a recording substrate detainably within the space; and b) the recording substrate alternately insertable into and removable from the space, the recording substrate being recordable of signals that are at-least one of audio and video signals.

In a twenty-first preferred embodiment as an improvement on the foregoing first broad invention, there is included the surveillance and recording structure(s) (aforestated) which includes:

a) a recording structure(s) (aforestated) recording at-least one of audio and video signals, for providing interior space for containing a recording substrate therein and for intermittent alternate code-locking and unlocking a recording substrate detainably within the space; and b) the recording substrate alternately insertable into and removable from the space, the recording substrate being recordable of signals that are at-least one of audio and video signals.

In a further improvement of each of the foregoing twentieth and twenty-first preferred embodiments, the surveillance and recording structure(s) includes any one or more of, or alternately all of the structures and functions and details thereof as set-forth in the present inventor's prior issued aforenoted U.S. Pat. No. 5,400,185 issued on Mar. 21, 1995

(former U.S. Ser. No. 272,077), the entire disclosure of that patent and former patent application being herewith incorporated by reference into and constituting a part of this disclosure.

In a twenty-second preferred embodiment as an improvement on the foregoing twentieth preferred embodiment, the circuitry structure(s) (aforestated) includes a wired circuit, and further includes battery structure(s) (aforestated) for providing direct current to and through the circuitry structure(s) (aforestated) through the wired circuit to the surveillance and recording structure(s) (aforestated). The battery structure(s) (aforestated) are mounted on at-least one of the handgun holster and the sidearm weapon-mounting support structure.

In a twenty-third preferred embodiment as an improvement on the foregoing twenty-second preferred embodiment, the circuitry structure(s) (aforestated) includes a power off-on circuitry switch in series with the wired circuit, for alternately turning on and off direct electric current electrical power to the surveillance and recording structure(s) (aforestated).

In a twenty-fourth preferred embodiment as an improvement on the foregoing first broad invention, the circuitry structure(s) (aforestated) includes a wired circuit, and further includes battery structure(s) (aforestated) for providing direct current to and through the circuitry structure(s) (aforestated) through the wired circuit to the surveillance and recording structure(s) (aforestated). The battery structure(s) (aforestated) are mounted on at-least one of the handgun holster and the sidearm weapon-mounting support structure.

In a twenty-fifth preferred embodiment as an improvement on the foregoing twenty-third preferred embodiment, the circuitry structure(s) (aforestated) includes a power off-on circuitry switch in series with the wired circuit, for alternately turning on and off direct electric current electrical power to the surveillance and recording structure(s) (aforestated).

In a twenty-sixth preferred embodiment as an improvement on the foregoing twenty-fifth preferred embodiment, there is included a weapon-mounting case containable of an additional on-off switch for closing operatively electrical power circuit from the battery structure(s) (aforestated) and power circuitry of the surveillance and recording structure(s) (aforestated). The additional on-off switch are turned-on by withdrawal of a weapon mounted from the weapon-mounting case, and turned-of by reinsertion of the weapon.

In a twenty-seventh preferred embodiment as an improvement on the foregoing twenty-third preferred embodiment, there is included a weapon-mounting case containable of an additional on-off switch for closing operatively electrical power circuit from the battery structure(s) (aforestated) and power circuitry of the surveillance and recording structure(s) (aforestated). The additional on-off switch is turned-on by withdrawal of a weapon mounted in the weapon-mounting case being withdrawn from the weapon-mounting case, and turned-off by reinsertion of the weapon.

As a second broad embodiment, the invention may be described as a surveillance and recording unit-mountable weapon-carrying device adaptable for ready access and recording activation to timely record surrounding evidentiary recordable data when mounted on a body-worn weapon-mounting support structure, including as a combination:

1) at least one weapon-transportable vessel-structure(s) (aforestated) for transporting a weapon and for mounting on a weapon-mounting support structure; and 2) a surveillance and recording structure(s) (aforestated) retainer-unit structure(s) (aforestated) for mounting at least one of a) an audio recorder and b) a combination audio and vidio recorder, onto at-least one of the weapon-transportable vessel structure(s) (aforestated); and 3) a circuitry structure(s) (aforestated) for providing battery power to and for being operatively connected to a surveillance and recording unit when a surveillance and recording unit is mounted on at least one the weapon-transportable vessel-structure(s) (aforestated) and on the surveillance and recording structure(s) (aforestated) retainer-unit structure(s) (aforestated); and 4) a semiautomatic on-off switch structure(s) (aforestated) for alternately activating and deactivating a surveillance and recording structure(s) (aforestated) when mounted within the surveillance and recording unit structure(s) (aforestated), mounted on at-least one of the weapon-transportable vessel-structure(s) (aforestated) and the surveillance and recording unit structure(s) (aforestated).

Thereby, withdrawal of a weapon from the at-least one of the weapon-transportable vessel-structure(s) (aforestated) and the surveillance and recording unit structure(s) (aforestated), activates the surveillance and recording structure(s) (aforestated) and insertion of a handgun into the at-least one of the weapon-transportable vessel-structure(s) (aforestated) and the surveillance and recording unit structure(s) (aforestated), deactivates the surveillance and recording structure(s) (aforestated), whenever concurrently the surveillance and recording structure(s) (aforestated) is mounted within the surveillance and recording structure(s) (aforestated) retainer-unit structure(s) (aforestated).

In a twenty-eighth preferred embodiment as an improvement on the foregoing second broad invention, there is included a plurality of the weapon-transportable vessel-structure(s) (aforestated), the plurality being in parallel circuitry to one-another such that each of the plurality is separately activateable and deactivateable.

In a twenty-ninth preferred embodiment as an improvement on the foregoing twenty-eighth preferred invention, there is included a combination audio and vidio recorder.

In a thirtieth preferred embodiment as an improvement on the foregoing twenty-ninth preferred embodiment, the surveillance and recording unit structure(s) (aforestated) includes automatic time recording structure(s) (aforestated) for recording exact time when recording is initiated onto a substrate by the surveillance and recording unit structure(s) (aforestated).

In a thirty-first preferred embodiment as an improvement on the foregoing seventeenth preferred embodiment, the surveillance and recording unit structure(s) (aforestated) includ(s) automatic time recording structure(s) (aforestated) for recording exact time when recording is initiated onto a substrate by the surveillance and recording unit structure(s) (aforestated).

BRIEF DESCRIPTION OF THE FIGURES

FIG. 1 diagrammatically and symbolically illustrates in side in-part view a surveillance and recording unit-mountable hand-holster device of this invention, together with various preferred embodiments thereof.

FIG. 2 diagrammatically and symbolically illustrates in side in-part view a surveillance and recording unit-mountable hand-holster device of the FIG. 1 embodiment, in a front view taken along line 2—2 of FIG. 1.

FIG. 3 diagrammatically and symbolically illustrates in side in-part view a surveillance and recording unit-mountable hand-holster device of the FIG. 1 embodiment, in a top view taken along line 3—3 of FIG. 1.

DETAILED DESCRIPTION OF BROAD AND PREFERRED EMBODIMENTS

Figure 4:
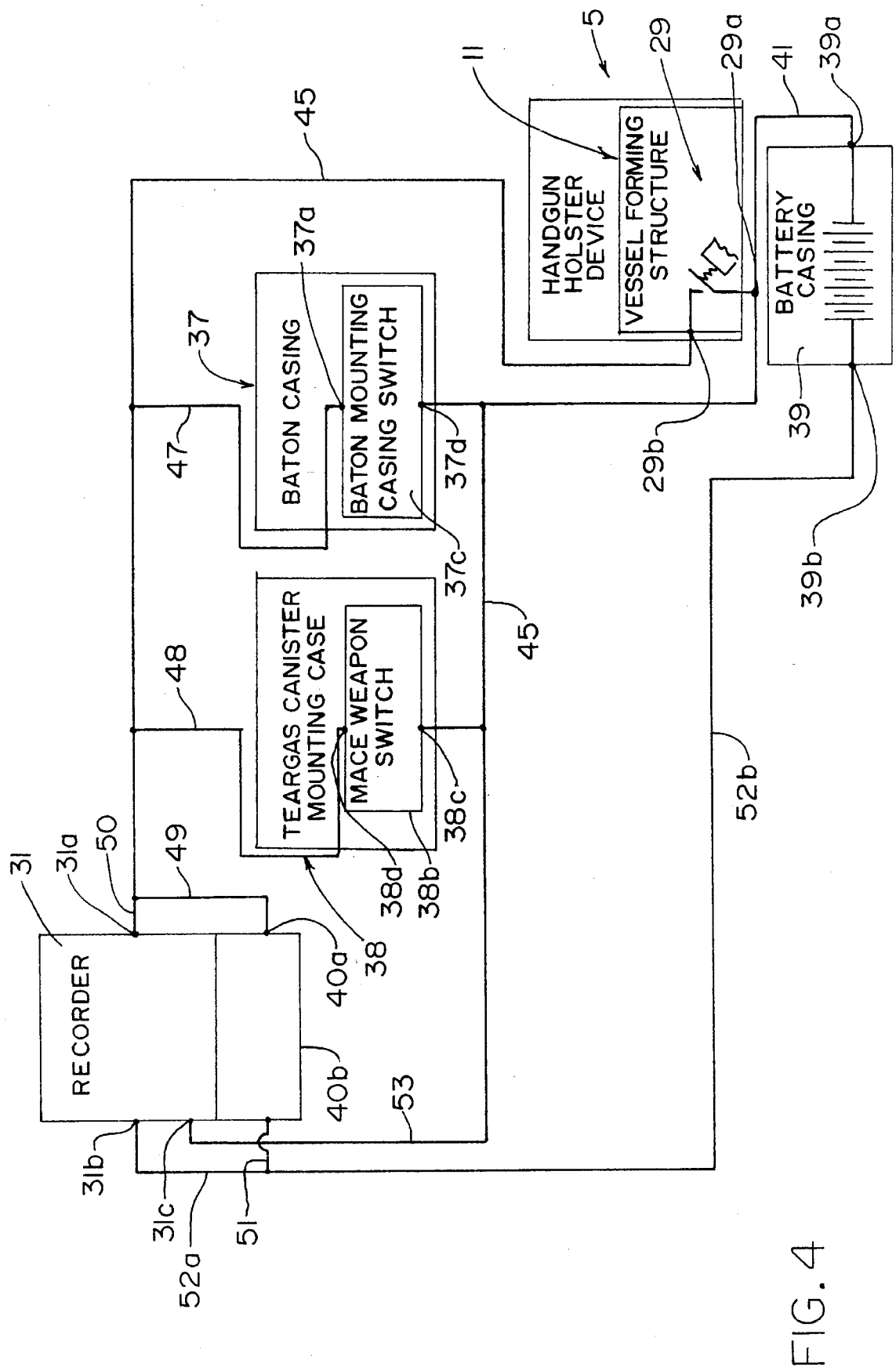
FIG. 4 diagrammatically and symbolically illustrates a block diagrammatic circuitry of the surveillance and recording unit-mountable hand-holster device of the embodiments of FIGS. 1 through 3.

FIG. 1 diagrammatically and symbolically illustrates in side in-part view a surveillance and recording unit-mountable handgun-holster device 5 of this invention. The body-mounting belt 6 by suspension strip 25 mounts the unified holster recorder-mounting structure and the recorder-holder thereof and the recorder itself, and switches and circuitries as an overall unitary combination. The outwardly-facing holster side face 7 at its forward edge becomes continuous with the holster forward face 8 which at its rearward edge becomes continuous with the holster body-facing inward face 25A that at its upper end is fixedly mounted on the aforestated suspension strip 25, apart from the unattached portion forming the handgun-holster gun-mounting port 24, shown in cut-away portion of an upper rearward edge of the outwardly-facing holster side face 7, receivable of the gun 27 shown in in-part view in phantom lines. The holster body-facing inward face 25A at the holster rearward edge 10 is continues with (or attached to rearward portion 10A of the inward face holster body-facing 25A at a rearward edge 10 of the outwardly-facing holster side face 7, inner gun-mounting space 9 shown in-cut-away portion of the outwardly-facing holster side face 7. Mounted on and/or integral with a forward edge or portion of the outwardly-facing holster side face 7 is the holster forwardly-facing forward face 8 mountedly attached to and/or continuous therewith. Within a lower illustrative cut-away in the outwardly-facing holster side face 7, is illustrated symbolically a normally-open electrical circuitry holster inner-space switch 29 showing a switch contact 28 in a closed-state to which contact 29a is pressed by an inserted portion 27a of the aforestated mounted holster-gun 27 when in a holster-mounted state), also shown with the unpressed contact 29b (whenever the gun is withdrawn from the handgun holster port 24). Mounted on and/or integral with and/or attached to the outwardly-facing holster side face 7, is the combination 11 of surveillance and recording unit-mountable vessel-forming structure 12 and the surveillance and recording unit 31 mounted within the surveillance and recording unit-mountable vessel-forming structure inclusive of the outward (sidewardly) extending wall structure 21 and the mounted and secured cover plate 20 anchored directly or indirectly together with or to the outerwardly-facing holster side face 7 by tamper-proof screws typically designated 17a, 17b, etc., forming a mounting space in which is secured the surveillance and recording unit 19 of conventional type and/or of the type set-forth in the aforestated U.S. Pat. No. 5,400,185. The aforestated wall structure 21 has an upper face 15, a forward face 13, a bottom face 14, and a rearward face 21a. The cover plate 20 has an open port 20 through which is accessible the typical code-combination dials 22a and 22b by which the tape insertion and removal door is alternately locked-on and unlocked and openable for removal or insertion of a conventional or other recording tape (or the like). The cocking-member 26 shown in phantom, of the same gun 27 shown in phantom, is a conventional lachable and delachable strap 30 (anchored onto the holster inward face 25A) having a latching snap (or the like) latchable to the outwardly-directed face 7 at the distal end 23 of the strap 30.

In FIG. 2, as a top view along lines 2—2 of FIG. 1, in the forward face 13 is a recorder casing forward port 19 of sufficient size and positioned as to exposed the recorder forward face 31a and the forwardly-facing vidio lense 32 and microphone 33 thereof. This Figure discloses in a illustrative cut-away view thereof again the inner space 9 of the holster. In another illustrative partial cut-away of an outer-most portion of the aforestated forward face 13, is shown typically embedded electrical circuitry wires 34 and 35. The belt 6, more fully illustrated in this Figure, is shown in cross-section as portion 6b and as a continuing belt 6a. Shown in the belt cross-section 6b are typically embedded circuitry wires 36a, 36b, 36c and 36d. In an further-along segment of time belt 6a is a mounted baton mounting-casing 37 and baton 37a upper handle portion with the baton lower shaft 37b mounted therethrough, and in another segment of the belt is mace weapon or teargas-canister mounting casing 38 and the gas-canister 38a thereof. In a further segment is a mounted battery casing 39 typically removably (replaceably) embodying conventional replaceable conventional recorder and/or video required DC batters therein. Associated with the baton-mounting casing is another switch 37c in electrical circuitry parallel with the aforestated switch 29, as an alternate switch for semiautomatically alternately turning-on and off tile recorder unit 31 upon the removal told subsequent reinsertion of tile baton 37a from its casing 37, and likewise for the alternate switch 38b in electrical parallel with switches 29 and 37c, for actuation upon removal of the mase weapon 38a from mase weapon case 38, and deactivation upon reinsertion of the mase weapon 38a.

FIG. 3 illustrates a top view of each of the FIGS. 1 and 2, further illustrated features and elements already previously above-described.

FIG. 4 illustrates the aforestated block diagrammatic circuitry of the surveillance and recording unit-mountable handgun-holster device of embodiments of FIGS. 1 through 3. For the respective aforestated elements inclusive of the recorder 31 and its holster-casing switch 29, and other weapon cases 37 and 38 and their respective switches 37c and 38b thereof, and for the battery 39, a typical conventional type circuitry and leads thereof are illustrated. From the belt-mounted conventional DC battery 39, there are battery terminals 39a and 39b, with leads 41 and 52b to and from the battery 39. From lead 45, there are a plurality of leads such as leads 41 and 45 between battery terminal 39b and recorder terminal 31b, and lead 45 terminals 29a to the holster switch terminal 29a and to terminal 37d of the baton weapon case-switch 37c and to baton weapon case-switch 37c, and to terminal 38c to mace switch 38b of mace case 38, baton weapon case switch's terminal 38c. The lead 46 from contact 29b of the switch 29, and the lead 47 from contact 37d of the holster-casing switch 37c, and the lead 48 from contact 38d of baton case-switch 37c, each are continuous with the lead 50 to the recorder 31 and with the lead 49 to a typically conventional or other available time and date-printer (or separate recorder) onto recording tape or substrate 40b having its respective electrical contacts 40a and 40b. The lead 46, 47 and 48 are in electrical parallel from terminals 38d of holster casing switch 29, and from the mace-case switch 38b, and from the switch 37c of the baton weapon-case switch 37. This circuitry illustrates additional conventional detail of the standard normally open switch 29. Additionally illustrated is the lead between recorder terminal 31c and the manual actuation lead 53 that is continuous with aforestated lead 45. Also lead 51 joins lead 52a and sequentially lead 52b to battery terminal 39b. The battery 39 utilized will be conventionally consistent with required power for energizing and operating of the aforestated functional elements of the holster and belt combination and whatever assortment of weapons casings and switches thereof as are desired and utilized as a part of the overall foregoing typical circuitry.

Accordingly, withdrawal of any one or more of the handgun and/or other weapon holders (casings) will cause its respective switch to become activated to thereby feed power to the recording unit until each and every weapon has been reinserted into its holster and/or casing. As aforestated herein and in the U.S. Pat. No. 5,400,185, the recorder and its time/date printer may be manually activated by the switch on the recorder itself, there being also (not illustrated) conventional powering circuitry for time/date printer activation whenever a recorder is conventionally manually activated. While the time/date recorder is separately illustrated in the circuitry, such circuitry and mechanism is a conventional part of existing conventional recorders and accordingly such conventional recorders and their combined time/date mechanisms may be utilized as a part of the recorder of this invention, within the spirit of the invention.

It is within the scope and contemplation of the present invention to make such variations and/or modifications and/or improvements as would be apparent to a person or ordinary skill in this art.

I claim:

1. A surveillance and recording unit-mountable handgun-holster device adaptable for ready access and exposure to surrounding evidentiary recordable data when mounted on a body-worn sidearm weapon-mounting support structure and concurrently extending through a substantially vertical side-slit of a police-like jacket or coat when the coat or jacket is concurrently worn, comprising in combination: 1) a sidearm handgun-holster including a) a first side-face portion with a first outer surface thereof positioned to face substantially inwardly toward a first location of a side of a trunk of a person when wearing a sidearm weapon-mounting support structure for mounting a handgun-holster, the first outer surface having oppositely-directed first forward and first trailing portions, b) a second side-face portion with a second outer surface thereof positioned to face substantially outwardly toward a second location away from the side of the trunk of the person wearing a sidearm weapon-mounting support structure, the second outer surface having oppositely-directed second forward and second trailing portions, c) a forwardly-facing portion with a third outer surface thereof positioned to face substantially forwardly of the trunk of the person wearing a sidearm weapon-mounting support structure, the forwardly-facing portion being intermediate between and continuous with and interconnecting said first forward portion and said second forward portion, and d) said first trailing portion and said second trailing portion being connected to one another forming (i) a handgun-receivable receptacle and handgun mounting-space thereof and (ii) a handgun access-port to and from the handgun-receivable receptacle, of a access-port size and shape for alternately mounting and withdrawing therethrough a handgun, the handgun-receivable receptacle, mounting space thereof and the handgun access-port jointly forming a handgun-holster alternately mountably-receivable and withdrawable of a handgun, and e) holster-mounting structure mountable of the handgun-holster onto a sidearm weapon-mounting support structure; 2) a surveillance and recording unit-mountable vessel-forming structure a) mounted on said sidearm handgun-holster and b) forming a surveillance and recording means retainer-unit and a retainer unit first port thereof adapted for alternately mounting and withdrawal of a surveillance and recording means and providing associated mounting space for a portable surveillance and recording means, said associated mounting space being of a first size and shape receivable of and transportable of a portable surveillance and recording means for alternately turning on and off recording mechanism thereof of evidentiary events occuring within detectable distances of the recording means, c) a port closure means for alternately non-access and access to and from said associated mounting space, and d) the surveillance and recording means retainer-unit including a retainer unit second port of a second size and shape i) insufficiently large for insertion therethrough of a portable surveillance and recording means for alternately turning on and off recording mechanism thereof of evidentiary events occuring within detectable distances and sufficient for detection therethrough of recordable evidentiary events occuring within detectable distances thereof, and ii) sufficiently large for detection therethrough of recordable evidentiary events occuring within detectable distances thereof by a portable surveillance and recording means for alternately turning on and off recording mechanism thereof of evidentiary events.

2. The surveillance and recording unit-mountable handgun-holster device of claim 1, including said sidearm weapon-mounting support structure and including a circuitry means for providing battery power to and for being operatively connected to a surveillance and recording unit when a surveillance and recording unit is mounted within said surveillance and recording unit-mountable vessel-forming structure, said circuitry means being mounted on at-least one of said sidearm handgun-holster, said surveillance and recording unit-mountable vessel-forming structure and said sidearm weapon-mounting support structure.

3. The surveillance and recording unit-mountable handgun-holster device of claim 1, in which a semiautomatic on-off switch means for alternately activating and deactivating a surveillance and recording means, is mounted on at-least one of said sidearm handgun-holster and said surveillance and recording unit-mountable vessel-forming structure, such that withdrawal of a handgun from said sidearm handgun-holster activates said surveillance and recording means and insertion of a handgun into said sidearm handgun-holster deactivates said surveillance and recording means, whenever concurrently said surveillance and recording means is mounted with said surveillance and recording unit-mountable vessel-forming structure.

4. The surveillance and recording unit-mountable handgun-holster device of claim 1, in which said retainer unit second port is positioned in said first forward portion.

5. The surveillance and recording unit mountable handgun-holster device of claim 1, in which said retainer unit second port is of a dimensional size sufficiently large as to provide outside access to activation and control means for turning on and for operating multiple functions of a surveillance and recording means when mounted within said retainer-unit.

6. The surveillance and recording unit-mountable handgun-holster device of claim 1, in which said retainer unit includes a third port of a dimensional size sufficiently large as to provide outside access to activation and control means for turning on and for operating multiple functions of a surveillance and recording means when mounted within said retainer-unit.

7. The surveillance and recording unit-mountable handgun-holster device of claim 1, in which at least one of said surveillance and recording means retainer-unit and a retainer unit first port structure includes said port closure means for alternately non-removeably locking a surveillance and recording means into the surveillance and recording means retainer-unit during periods of intended activation of a surveillance and recording means, and removably unlocking the surveillance and recording means retainer-unit for permitting removal of a previously utilized surveillance and recording means, during period of loading or reloading a replacement surveillance and recording means into the surveillance and recording means retainer-unit.

8. The surveillance and recording unit-mountable handgun-holster device of claim 1, in which said port closure means includes at-least one tamper-proof screw which when mounted locks the locking means, and when dismounted, unlocks said locking means.

9. The surveillance and recording unit-mountable handgun-holster device of claim 1, in which said port closure means includes at-least one tamper-proof screw which when mounted locks the locking means, and when dismounted, unlocks said locking means.

10. The surveillance and recording unit-mountable handgun-holster device of claim 1, including said surveillance and recording means which comprises:
   a) a recording means for recording at-least one of audio and video signals, for providing interior space for containing a recording substrate therein and for intermittent alternate code-locking and unlocking a recording substrate detainably within said space; and
   b) said recording substrate alternately insertable into and removable from said space, said recording substrate being recordable of signals that are at-least one of audio and video signals.

11. A surveillance and recording unit-mountable weapon-carrying device of claim 1, including a combination audio and video recorder.

12. The surveillance and recording unit-mountable handgun-holster device of claim 1, in which said circuitry means includes a wired circuit, and further includes battery means for providing direct current to and through said circuitry means through said wired circuit to said surveillance and recording means, the battery means being mounted on at-least one of said handgun holster and said sidearm weapon-mounting support structure.

13. The surveillance and recording unit-mountable handgun-holster device of claim 12, in which said circuitry means includes a power off-on circuitry switch in series with said wired circuit, for alternately turning on and off direct electric current electrical power to said surveillance and recording means.

14. The surveillance and recording unit-mountable handgun-holster device of claim 13, including a weapon-mounting case containable of an additional on-off switch for closing operatively electrical power circuit from said battery means and power circuitry of said surveillance and recording means, the additional on-off switch being turned-on by withdrawal of a weapon mounted in the weapon-mounting case being withdrawn from the weapon-mounting case.

15. The surveillance and recording unit-mountable handgun-holster device of claim 1, including a circuitry means for providing battery power to and for being operatively connected to a surveillance and recording unit when a surveillance and recording unit is mounted within said surveillance and recording unit-mountable vessel-forming structure, said circuitry means being mounted on at-least one of said sidearm handgun-holster and said surveillance and recording unit-mountable vessel-forming structure.

16. The surveillance and recording unit-mountable handgun-holster device of claim 15, including said sidearm weapon-mounting support structure and including a circuitry means for providing battery power to and for being operatively connected to a surveillance and recording unit when a surveillance and recording unit is mounted within said surveillance and recording unit-mountable vessel-forming structure, said circuitry means being mounted on at-least one of said sidearm handgun-holster, said surveillance and recording unit-mountable vessel-forming structure and said sidearm weapon-mounting support structure.

17. The surveillance and recording unit-mountable handgun-holster device of claim 16, in which a semiautomatic on-off switch means for alternately activating and deactivating a surveillance and recording means when mounted within said surveillance and recording unit-mountable vessel-forming structure, is mounted on at-least one of said sidearm handgun-holster and said surveillance and recording unit-mountable vessel-forming structure, such that withdrawal of a handgun from said sidearm handgun-holster activates said surveillance and recording means and insertion of a handgun into said sidearm handgun-holster deactivates said surveillance and recording means, whenever concurrently said surveillance and recording means is mounted with said surveillance and recording unit-mountable vessel-forming structure.

18. The surveillance and recording unit-mountable handgun-holster device of claim 17, in which said retainer unit second port is positioned in said first forward portion.

19. The surveillance and recording unit-mountable handgun-holster device of claim 18, in which said retainer unit second port is of a dimensional size sufficiently large as to provide outside access to activation and control means for turning on and for operating multiple functions of a surveillance and recording means when mounted within said retainer-unit.

20. The surveillance and recording unit-mountable handgun-holster device of claim 19, in which said retainer unit includes a third port of a dimensional size sufficiently large as to provide outside access to activation and control means for turning on and for operating multiple functions of a surveillance and recording means when mounted within said retainer-unit.

21. The surveillance and recording unit-mountable handgun-holster device of claim 20, in which at least one of said surveillance and recording means retainer-unit and a retainer unit first port structure includes said port closure means for alternately non-removeably locking a surveillance and recording means into the surveillance and recording means retainer-unit during periods of intended activation of a surveillance and recording means, and removably unlocking the surveillance and recording means retainer-unit for permitting removal of a previously utilized surveillance and recording means, during period of loading or reloading a replacement surveillance and recording means into the surveillance and recording means retainer-unit.

22. The surveillance and recording unit-mountable handgun-holster device of claim 21, in which said port closure means includes at-least one tamper-proof screw which when mounted locks the locking means, and when dismounted, unlocks said locking means.

23. The surveillance and recording unit-mountable handgun-holster device of claim 1, including said surveillance and recording means.

24. The surveillance and recording unit-mountable handgun-holster device of claim 23, in which said surveillance and recording means includes sound-recording and video mechanisms.

25. A surveillance and recording unit-mountable weapon-carrying device of claim 23, in which said surveillance and recording unit means includes automatic time recording means for recording exact time when recording is initiated onto a substrate by the surveillance and recording unit means.

26. The surveillance and recording unit-mountable handgun-holster device of claim 23, in which said surveillance and recording means includes a sound-recording mechanism.

27. The surveillance and recording unit-mountable handgun-holster device of claim 26, in which said surveillance and recording means comprises:

a) a recording means for recording at-least one of audio and video signals, for providing interior space for containing a recording substrate therein and for intermittent alternate code-locking and unlocking a recording substrate detainably within said space; and b) said recording substrate alternately insertable into and removable from said space, said recording substrate being recordable of signals that are at-least one of audio and video signals.

28. The surveillance and recording unit-mountable handgun-holster device of claim 27, in which said circuitry means includes a wired circuit, and further includes battery means for providing direct current to and through said circuitry means through said wired circuit to said surveillance and recording means, the battery means being mounted on at-least one of said handgun holster and said sidearm weapon-mounting support structure.

29. The surveillance and recording unit-mountable handgun-holster device of claim 28, in which said circuitry means includes a power off-on circuitry switch in series with said wired circuit, for alternately turning on and off direct electric current electrical power to said surveillance and recording means.

30. The surveillance and recording unit-mountable handgun-holster device of claim 29, including a weapon-mounting case containable of an additional on-off switch for closing operatively electrical power circuit from said battery means and power circuitry of said surveillance and recording means, the additional on-off switch being turned-on by withdrawal of a weapon mounted in the weapon-mounting case being withdrawn from the weapon-mounting case.

31. A surveillance and recording unit-mountable weapon-carrying device adaptable for ready access and recording activation to timey record surrounding evidentiary recordable data when mounted on a body-worn weapon-mounting support structure, comprising in combination: 1) at least one weapon-transportable vessel-means for transporting a weapon and for mounting on a weapon-mounting support structure; and 2) a surveillance and recording means-retainer-unit means for mounting at least one of a) an audio recorder and b) a combination audio and video recorder, onto at-least one of said weapon-transportable vessel means; and 3) a circuitry means for providing battery power to and for being operatively connected to a surveillance and recording unit when a surveillance and recording unit is mounted on at least one said weapon-transportable vessel-means and on said surveillance and recording means-retainer-unit means; and 4) a semiautomatic on-off switch means for alternately activating and deactivating a surveillance and recording means when mounted within said surveillance and recording unit means, mounted on at-least one of said weapon-transportable vessel-means and said surveillance and recording unit means, such that withdrawal of a weapon from said at-least one of said weapon-transportable vessel-means and said surveillance and recording unit means, activates said surveillance and recording means and insertion of a handgun into said at-least one of said weapon-transportable vessel means and said surveillance and recording unit means, deactivates said surveillance and recording means, whenever concurrently said surveillance and recording means is mounted within said surveillance and recording means-retainer-unit means.

32. A surveillance and recording unit-mountable weapon-carrying device of claim 31, in which said surveillance and recording unit means includes automatic time recording means for recording exact time when recording is initiated onto a substrate by the surveillance and recording unit means.

33. A surveillance and recording unit-mountable weapon-carrying device of claim 31, including a plurality of said weapon-transportable vessel-means, said plurality being in parallel circuitry to one-another such that each of said plurality is separately activateable and deactivateable.

34. A surveillance and recording unit-mountable weapon-carrying device of claim 33, including a combination audio and video recorder.

* * * * *